United States Patent
Chang

(10) Patent No.: US 7,974,022 B2
(45) Date of Patent: Jul. 5, 2011

(54) LENS MODULE AND CAMERA MODULE UTILIZING THE SAME

(75) Inventor: Jen-Tsorng Chang, Taipei-Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 390 days.

(21) Appl. No.: 12/170,756

(22) Filed: Jul. 10, 2008

(65) Prior Publication Data
US 2009/0174953 A1    Jul. 9, 2009

(30) Foreign Application Priority Data
Jan. 9, 2008    (CN) .......................... 2008 1 0300056

(51) Int. Cl.
*G02B 7/02* (2006.01)
(52) U.S. Cl. .......................... 359/815; 359/824; 359/811
(58) Field of Classification Search .................. 359/811, 359/813, 815, 819–824
See application file for complete search history.

(56) References Cited

U.S. PATENT DOCUMENTS
| | | | |
|---|---|---|---|
| 6,967,785 B2 | 11/2005 | Makii et al. | |
| 7,177,103 B2 * | 2/2007 | Yamashita et al. | 359/822 |
| 2008/0017942 A1 * | 1/2008 | Kosaka et al. | 257/432 |

* cited by examiner

*Primary Examiner* — Joseph Martinez
*Assistant Examiner* — Brandi N Thomas
(74) *Attorney, Agent, or Firm* — Andrew C. Cheng

(57) ABSTRACT

A lens module includes a barrel, a first lens, an annular retaining member and three driving devices. The retaining member is arranged in the barrel. The driving devices are arranged on the retaining member. Each of the driving devices has a base attached on the retaining member, a plurality of first electrodes formed on the base and a comb-shaped carrier. The carrier has a beam attached on the base and a plurality of second electrodes extending from the beam and suspended above the first electrodes at a first position. The first lens is carried by the second electrodes. When a first voltage is applied on the first electrodes and a second voltage is applied on the second electrodes, an electrostatic force is generated between the first electrodes and the second electrodes, and the second electrodes are moved down, such that the first lens is brought to a second position.

12 Claims, 3 Drawing Sheets

LENS MODULE AND CAMERA MODULE UTILIZING THE SAME

BACKGROUND

1. Technical Field

The present invention relates to lens modules, and particularly to a lens module with a driving device for a single lens, and a camera module utilizing the lens module.

2. Description of Related Art

With the ongoing developments in microcircuitry and multimedia technology, camera modules, including both optical and digital camera modules are now in widespread use and are being combined with various electronic devices. These cameras modules are often required to have autofocus or zoom functions.

Lens modules are main components of the cameras modules. Currently, driving devices, such as step motors, have been integrated in the lens modules for moving the lenses, thereby achieving the autofocus or zoom functions. However, the step motor is relatively bulky and heavy when applied to a single lens, and, in addition, consumes a substantial amount of power, especially relative to the amount of power that can be stored in a typical battery of an electronic device.

What is needed, therefore, is a lens module having a simple and energy-efficient driving device for a single lens, and a camera module using the lens module.

SUMMARY

An exemplary lens module includes a lens barrel, a first lens, an annular retaining member and at least three driving devices. The annular retaining member is arranged in the lens barrel. The at least three driving devices are arranged on the retaining member. Each of the driving devices has a base attached on the retaining member, a plurality of first electrodes formed on the base, and a comb-shaped carrier. The comb-shaped carrier has a beam attached on the base and a plurality of second electrodes extending from the beam and suspended above the first electrodes in a first position. The first lens is carried by the second electrodes of the at least three driving devices. When a first voltage is applied on the first electrodes and a second voltage is applied on the second electrodes, an electrostatic force is generated between the first electrodes and the second electrodes, and the second electrodes are moved towards the first electrodes, bringing the first lens to a second position.

Other advantages and novel features of the present invention will become more apparent from the following detailed description of embodiments when taken in conjunction with the accompanying drawings.

BRIEF DESCRIPTION OF THE DRAWINGS

Many aspects of the lens module and camera module can be better understood with reference to the following drawings. The components in the drawings are not necessarily drawn to scale, the emphasis instead being placed upon clearly illustrating the principles of the present lens module and camera module. Moreover, in the drawings, like reference numerals designate corresponding parts throughout the several views.

DETAILED DESCRIPTION OF THE EMBODIMENTS

The embodiment of the present lens module and camera module will now be described in detail below and with reference to the drawings.

Figure 1:
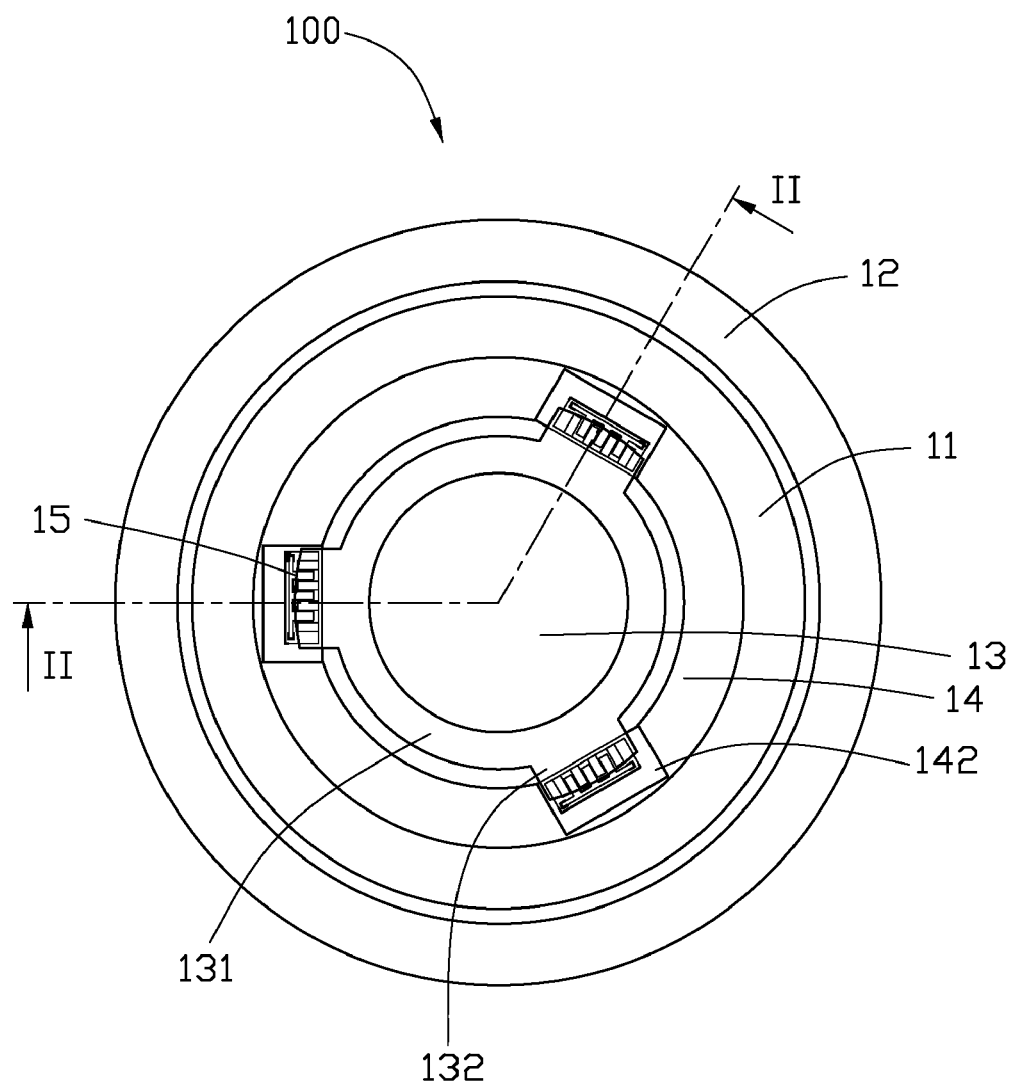
FIG. 1 is a plan view of a camera module in accordance with an embodiment of the present invention.
Figure 2:
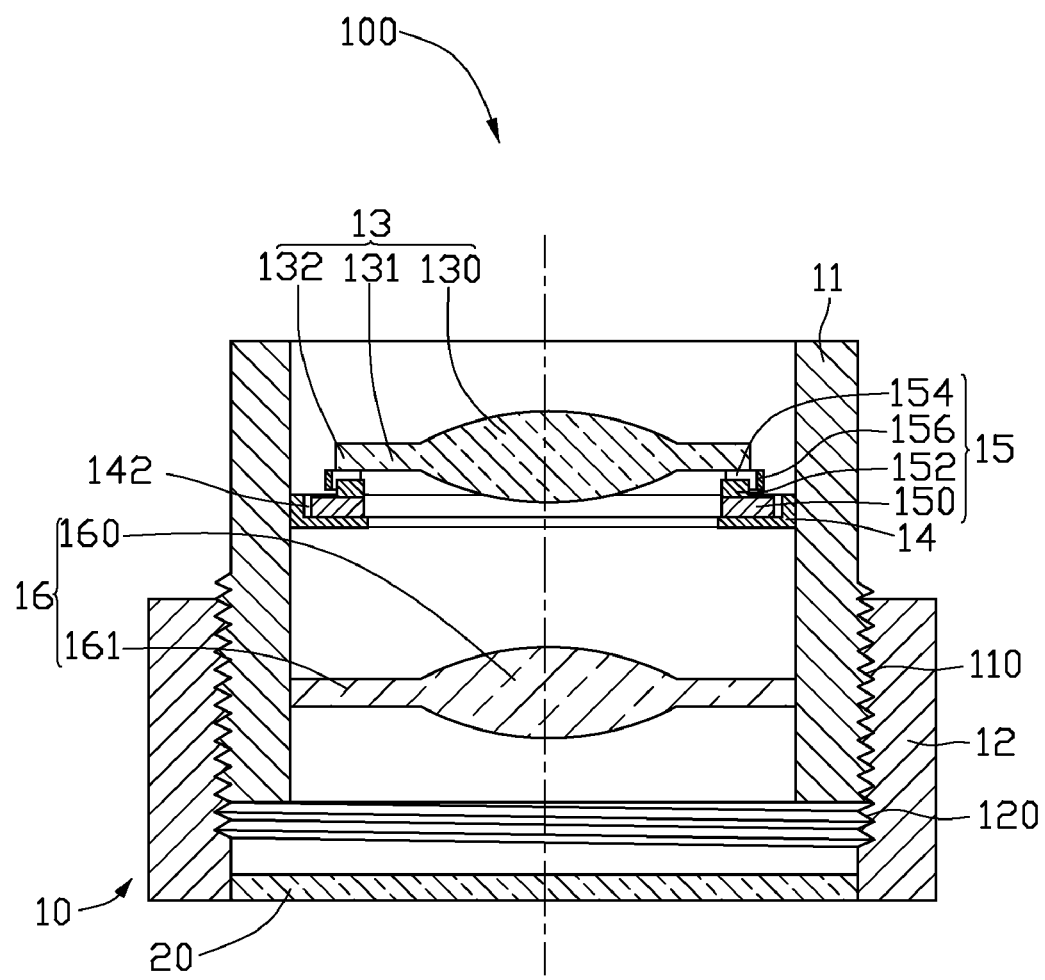
FIG. 2 is a cut-away view of the camera module taken along II-II line shown in FIG. 1.
Figure 3:
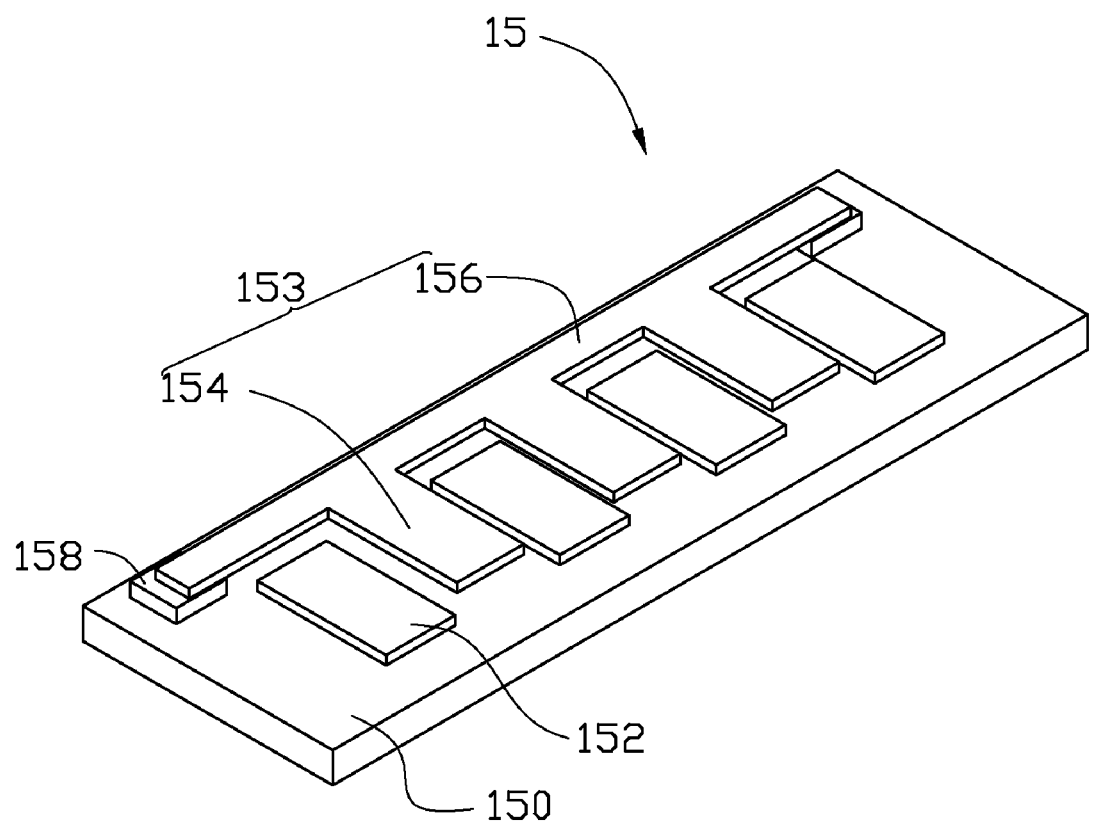
FIG. 3 is a schematic view of a driving device shown in FIG. 1.

Referring to FIGS. 1 to 3, an exemplary camera module 100 in accordance with an embodiment, is provided. The camera module 100 includes a lens module 10 and an image sensor 20 in alignment with the lens module 10.

The lens module 10 includes a lens barrel 11, a holder 12, a first lens 13, a second lens 16, an annular retaining member 14, and three driving devices 15 for moving the first lens 13.

The lens barrel 11 and the holder 12 are both cylindrical. The lens barrel 11 has an outer thread 10 formed thereon. The holder 12 has an inner thread 120 formed therein. The lens barrel 11 is threaded with the holder 12. The image sensor 20 is received in the holder 12.

The first lens 13 and the second lens 16 can be made of plastic or glass. The first and second lenses 13, 16 each have a central optical portion 130, 160 and a peripheral portion 131, 161 surrounding the central optical portion 130, 160. The central optical portions 131, 161 each can be spherical or aspherical. Three anchors 132 are defined on an outer wall of the peripheral portion 131 of the first lens 13 and are spaced from each other.

The second lens 16 and the annular retaining member 14 are received in the lens barrel 11, and are secured to the inner wall of the lens barrel 11. The retaining member 14 has three spaced recesses 142 formed in an inner wall thereof.

Each of the driving devices 15 is received in one of the respective recesses 142 of the annular retaining member 14. Each of the driving devices 15 has a base 150, a number of first electrodes 152, two pads 158, and a comb-shaped carrier 153. The first electrodes 152 and the pads 158 are formed on the base 150. The first electrodes 152 are parallel. The comb-shaped carrier 153 has a beam 156 and a number of second electrodes 154 extending therefrom. The beam 156 is attached on the two pads 158. The second electrodes 154 are suspended above the first electrodes 152. The first electrodes 152 and the second electrodes 154 are staggered with each one of the second electrodes 154 oriented on and between each two adjacent first electrodes 152 at a first position. The first electrodes 152 and the comb-shaped carrier 153 can be made from silicon by micromachining. The three anchors 132 of the first lens 13 are secured on the second electrodes 154 of the three driving devices 15.

When a first voltage is applied on the first electrodes 152 and a second voltage is applied on the second electrodes 154, an electrostatic force is generated between the first electrodes 152 and the second electrodes 154, and the second electrodes 154 are moved down towards the first electrodes 152, thereby bringing the first lens 13 to a second position. When the first and second voltages are powered off, the electrostatic force between the first electrodes 152 and the second electrodes 154 disappears, and the second electrodes 154 together with the first lens 13 return to the first position. In this way, the first lens 13 is moved relative to the second lens 16 and the image sensor 20 between the first position and the second position, thus achieving the zoom function of the camera module 100.

The number of driving devices 15 and the height of the pads 158 can vary according to need.

It is understood that the above-described embodiments are intended to illustrate rather than limit the invention. Varia-

What is claimed is:

1. A lens module, comprising:
a lens barrel;
an annular retaining member arranged in the lens barrel;
at least three driving devices arranged on the annular retaining member, each of the driving devices comprising a base attached on the retaining member, a plurality of first electrodes formed on the base and a comb-shaped carrier, the comb-shaped carrier comprising a beam attached on the base and a plurality of second electrodes extending from the beam and suspended above the first electrodes at a first position; and
a first lens carried by the second electrodes of the at least three driving devices, wherein when a first voltage is applied on the first electrodes and a second voltage is applied on the second electrodes, an electrostatic force is generated between the first electrodes and the second electrodes, and the second electrodes are moved towards the first electrodes, thereby bringing the first lens to a second position.

2. The lens module as described in claim 1, wherein the first lens comprises at least three anchors on an outer wall thereof, the at least three anchors being secured to the second electrodes of the respective at least three driving devices.

3. The lens module as described in claim 1, wherein the beam of each of the comb-shaped carriers is attached on the base by two pads.

4. The lens module as described in claim 1, wherein each of the second electrodes is oriented upon and between each two adjacent the first electrodes.

5. The lens module as described in claim 1, further comprising a second lens received in the lens barrel and aligned with the first lens.

6. A camera module, comprising:
a lens barrel;
an annular retaining member arranged in the lens barrel;
at least three driving devices arranged on the annular retaining member, each of the driving devices comprising a base attached on the retaining member, a plurality of first electrodes formed on the base and a comb-shaped carrier, the comb-shaped carrier comprising a beam attached on the base and a plurality of second electrodes extending from the beam and suspended above the first electrodes at a first position;
a first lens carried by the second electrodes of the at least three driving devices;
a second lens received in the lens barrel and aligned with the first lens; and
an image sensor aligned with the first and second lenses, wherein when a first voltage is applied on the first electrodes and a second voltage is applied on the second electrodes, an electrostatic force is generated between the first electrodes and the second electrodes, and the second electrodes are moved towards the first electrodes, thereby bringing the first lens to a second position relative to the second lens and the image sensor.

7. The camera module as described in claim 6, wherein the first lens comprises at least three anchors on an outer wall thereof, the at least three anchors being secured to the second electrodes of the respective at least three driving devices.

8. The camera module as described in claim 6, wherein the beam of each of the comb-shaped carriers is attached on the base by two pads.

9. The camera module as described in claim 6, wherein each of the second electrodes is oriented upon and between each two adjacent the first electrodes.

10. The lens module as described in claim 1, wherein the annular retaining member comprises at least three spaced recesses formed in an inner wall thereof, and each of the driving devices is received in one of the recesses.

11. The camera module as described in claim 6, wherein the annular retaining member comprises at least three spaced recesses formed in an inner wall thereof, and each of the driving devices is received in one of the recesses.

12. A lens module, comprising:
a lens barrel;
an annular retaining member arranged in the lens barrel, the annular retaining member comprising three spaced recesses formed in an inner wall thereof;
three driving devices received in the respective recesses of the annular retaining member, each of the driving devices comprising a base attached to the retaining member, a plurality of first electrodes formed on the base and a comb-shaped carrier, the comb-shaped carrier comprising a beam attached on the base and a plurality of second electrodes extending from the beam and suspended above the first electrodes at a first position; and
a first lens carried by the second electrodes, the first lens comprising three anchors on an outer wall thereof, the anchors being secured to the second electrodes, wherein when a first voltage is applied on the first electrodes and a second voltage is applied on the second electrodes, an electrostatic force is generated between the first electrodes and the second electrodes, and the second electrodes are moved towards the first electrodes, thereby bringing the first lens to a second position along an optical axis of the first lens.

* * * * *